(12) United States Patent
Corbett et al.

(10) Patent No.: US 6,934,546 B1
(45) Date of Patent: Aug. 23, 2005

(54) METHOD AND APPARATUS FOR CONTROL OF SOFT HANDOFF USAGE IN RADIOCOMMUNICATION SYSTEMS

(75) Inventors: Eddie Corbett, Stockholm (SE); Billy Hogan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1207 days.

(21) Appl. No.: 09/069,765

(22) Filed: Apr. 30, 1998

(51) Int. Cl.$^7$ .............................................. H04Q 7/20
(52) U.S. Cl. .................................... 455/441; 455/442
(58) Field of Search ................................ 455/442, 441, 455/440, 456, 436, 562, 33.3, 33.2, 67.1, 455/33, 12.1; 370/331, 332, 32.1, 13

(56) References Cited

U.S. PATENT DOCUMENTS

| | | | |
|---|---|---|---|
| 5,305,308 A * | 4/1994 | English et al. ............. 370/32.1 | |
| 5,434,853 A * | 7/1995 | Hemmady et al. | |
| 5,495,580 A | 2/1996 | Osman | |
| 5,522,047 A | 5/1996 | Grow et al. | |
| 5,548,808 A * | 8/1996 | Bruckert et al. ............ 455/442 | |
| 5,638,512 A | 6/1997 | Osman et al. | |
| 5,659,718 A | 8/1997 | Osman et al. | |
| 5,848,063 A * | 12/1998 | Weaver, Jr. et al. ........ 370/331 | |
| 5,933,787 A * | 8/1999 | Gilhousen et al. .......... 455/562 | |
| 6,246,861 B1 * | 6/2001 | Messier et al. ............ 455/12.1 | |
| 6,421,538 B1 * | 7/2002 | Byrne ........................ 455/441 | |

* cited by examiner

*Primary Examiner*—William D. Cumming

(57) ABSTRACT

Radiocommunication systems having improved soft handoff capabilities are described. During soft handoff a mobile station may have several transmission sources (active set members) supplying it with substantially the same information. Mobile stations which are not moving may not require as many sources to provide adequate received signal quality. Therefore, mobile stations which are not moving are identified using locating techniques and members of the active set are compared with a higher threshold to remove weaker branches more rapidly than when using a threshold that is applied to mobile stations that are in motion.

16 Claims, 4 Drawing Sheets

METHOD AND APPARATUS FOR CONTROL OF SOFT HANDOFF USAGE IN RADIOCOMMUNICATION SYSTEMS

BACKGROUND

This invention generally relates to the field of communication systems having soft handoff capability and, more particularly, to reducing interference by restricting the application of soft handoff under certain circumstances.

A simplified layout of a cellular communications system is depicted in FIG. 1. Mobile stations M1–M10 communicate with the fixed part of a public switched telephone network (PSTN) by transmitting radio signals to, and receiving radio signals from, cellular base stations B1–B10. The cellular base stations B1–B10 are, in turn, connected to the PSTN via a Mobile Switching Center (MSC). Each base station B1–B10 transmits signals within a corresponding area, or "cell" C1–C10. Within each cell, a base station transmits to the mobile units over downlink RF channels, while the mobile units transmit information to the base station over uplink RF channels.

While cellular systems were originally designed to operate with a one-to-one correspondence between a mobile station and an associated base station covering a geographic cell, it has been determined that the effects of shadowing and fading can be reduced by communicating the same signal to a mobile station over more than one link. For instance, two different base stations can communicate the same information to a mobile station over two different spatially offset links. The mobile station processes the signals from the two links by selecting or combining them in some way, e.g., maximal ratio combining. This technique is known as diversity. Conventional spatial diversity techniques employ two or more separated antennas in a single base station, or two or more base stations, to communicate with a mobile station. However, diversity is not limited to spatially offsetting base stations or antennas (i.e., multiple transmission paths). Diversity transmission can also be generated using one or more of an offset in time, polarization, or frequency.

One area in which macro diversity is commonly practiced is during handoff. In such cases, the candidate base station (i.e., the base station to which a mobile station is to be handed off) starts transmitting substantially the same message information to the mobile station before the current, serving base station terminates its transmission of that message information. This usage of macro diversity is commonly referred to as soft handoff.

FIG. 2 illustrates a soft handoff arrangement wherein a first, original base station 202 and a second, candidate base station 204 each transmit a same message 206 to a mobile station 208. The message 206 is transmitted to the mobile station 208 over different signal paths in the forms of a first downlink 210 and a second downlink 212. The first and second downlink signals 210 and 212 are recombined (or one of the received signals is selected) in the mobile station 208 to extract the message 206. The mobile station 208 transmits to the base stations 202 and 204 over first and second uplink paths 214 and 216, respectively. At some point in time, the transmission of message information to the mobile station from the first, original base station 202 is terminated and the soft handoff process is concluded.

Soft handoffs can also be performed using multiple transmissions from a single base station. FIG. 3 depicts a single base station macro diversity arrangement wherein first and second directional lobes 318 and 320, generated by an antenna array 304, each cover a different area. The mobile station 308 can be handed off from one lobe to another in the manner described above. That is, the first directional lobe 318 maintains a first diversity link including a first downlink 310 which carries a message 306. The second directional lobe 320 establishes a second diversity link including a second downlink 312 which also carries the message 306. First and second uplinks 314 and 316 communicate from the mobile station 308 to the antenna array 304 within each lobe 318 and 320, respectively. Again, at some point in time transmissions from the original lobe will cease to complete the handoff. The same approach can be used with base stations having directional or sector antennas, wherein a soft handoff can be performed between sector antennas, which technique is sometimes referred to as "softer handoff".

In a soft handoff arrangement, the base stations and/or antennas communicating with a particular mobile station are known as "active set" members. For example, referring back to FIG. 2, base stations 202 and 204 would be considered members of the active set. Those skilled in the art will appreciate that more than two base stations and/or antennas can be part of the active set. Members of an active set can change as the mobile station passes into and out of coverage areas handled by base stations and/or antennas in the system.

Soft handoff has been used in many different types of radiocommunication systems, including those using time division multiple access (TDMA) and code division multiple access (CDMA). Soft handoff increases robustness, achieves improved downlink quality, and combats fading. However, soft handoff may sometimes negatively impact system capacity and network resources due to the additional transmitting source(s) used to transmit substantially the same information to a receiver.

Conventional soft handoff systems ordinarily utilize the same amount of downlink transmit power for each antenna in the active set. For instance, in IS-95 systems, the same transmit power level is used for all downlinks in the active set. Because of the undesirable interference to other users, careful consideration is required in adding and deleting members from the active set so that the interference in unrelated links is minimized. Accordingly, one method for controlling interference is to limit the number of base stations and/or antennas in an active set. This technique is described, for example, in published International Patent Application (PCT) WO/95/12297 to Gilhousen et al., wherein sectors involved in a softer handoff are monitored for reverse link signal strength. If the signal strength of transmissions from one of the sectors drops below a predetermined threshold for a predetermined period of time, then the base station discontinues transmissions from that sector.

Another method used in conventional systems to reduce the effects of unnecessary interference from soft handoff/macro diversity operation is power split control. In power split control, the downlink transmit power may be equally split between each active base station and/or antenna in an active set. That is, in the case where there are three downlinks, and a total transmission power of P is available, each of the downlinks has a transmission power level of P/3. However, even with such an allocation, there may be an unnecessary amount of interference introduced when the "weakest" downlink in the active set is operated at a P/I power level. More specifically, the link may, in effect provide a small improvement in communications robustness, but introduce, on balance, a greater amount of disruption to surrounding communications by unduly introducing interference. Consequently, the C/I ratio for adjacent cells can be negatively impacted with only a minimal gain in communications efficiency.

Recently, Applicants have recognized that some traffic models suggest that a majority of calls in radiocommunication systems, e.g., on the order of 70 percent, are made by mobile units which are relatively stationary. This phenomenon may be attributable to the rapid decrease in size of mobile units over the years, which now permits users to readily carry mobile units with them, as opposed to the earliest mobile units which were large enough to warrant leaving them in a vehicle. If a large number of these stationary calls are made from locations within a cell which trigger the system's soft handoff function, then it may be the case that a large number of stationary mobile units remain in soft handoff mode for the duration of one or more consecutive calls. That is, since the mobile units are stationary, the mobile units will continue to receive transmissions from multiple transmitting sources without being handed off. As described above, this will have a negative effect on the overall system capacity. Moreover, the mobile unit will not always reap significant, additional diversity gains from being in soft handoff mode when stationary.

Accordingly, it would be desirable to provide methods and systems for limiting the application of soft handoff in situations where mobile units are stationary to increase system capacity.

SUMMARY

The present invention solves the forgoing problems by identifying those mobile stations which are stationary or substantially stationary and either adjusting the threshold used to remove weakly received members from the active set or removing the weakest members unconditionally. In this way, additional system capacity is acquired without detrimentally affecting the quality of the stationary mobile station's connection.

Exemplary embodiments of the present invention use location information associated with a mobile station to determine if it is stationary. Any known locating technique can be used, either based in the mobile station itself or in the system. If the system identifies a particular connection as being associated with a stationary mobile station, then the system applies a higher threshold for keeping a transmission source in the active set for that connection so that it is more likely to reduce the number of members in the active set.

BRIEF DESCRIPTION OF THE DRAWINGS

These, and other, objects, features and advantages of the invention will be more readily understood by reading the following detailed description in conjunction with the drawings in which.

DETAILED DESCRIPTION

The following exemplary embodiments are provided in the context of CDMA radiocommunication systems. However, those skilled in the art will appreciate that this access methodology is merely used for the purposes of illustration and that the present invention is readily applicable to all types of access methodologies including frequency division multiple access (FDMA), time division multiple access (TDMA), code division multiple access (CDMA) and hybrids thereof.

Figure 1:
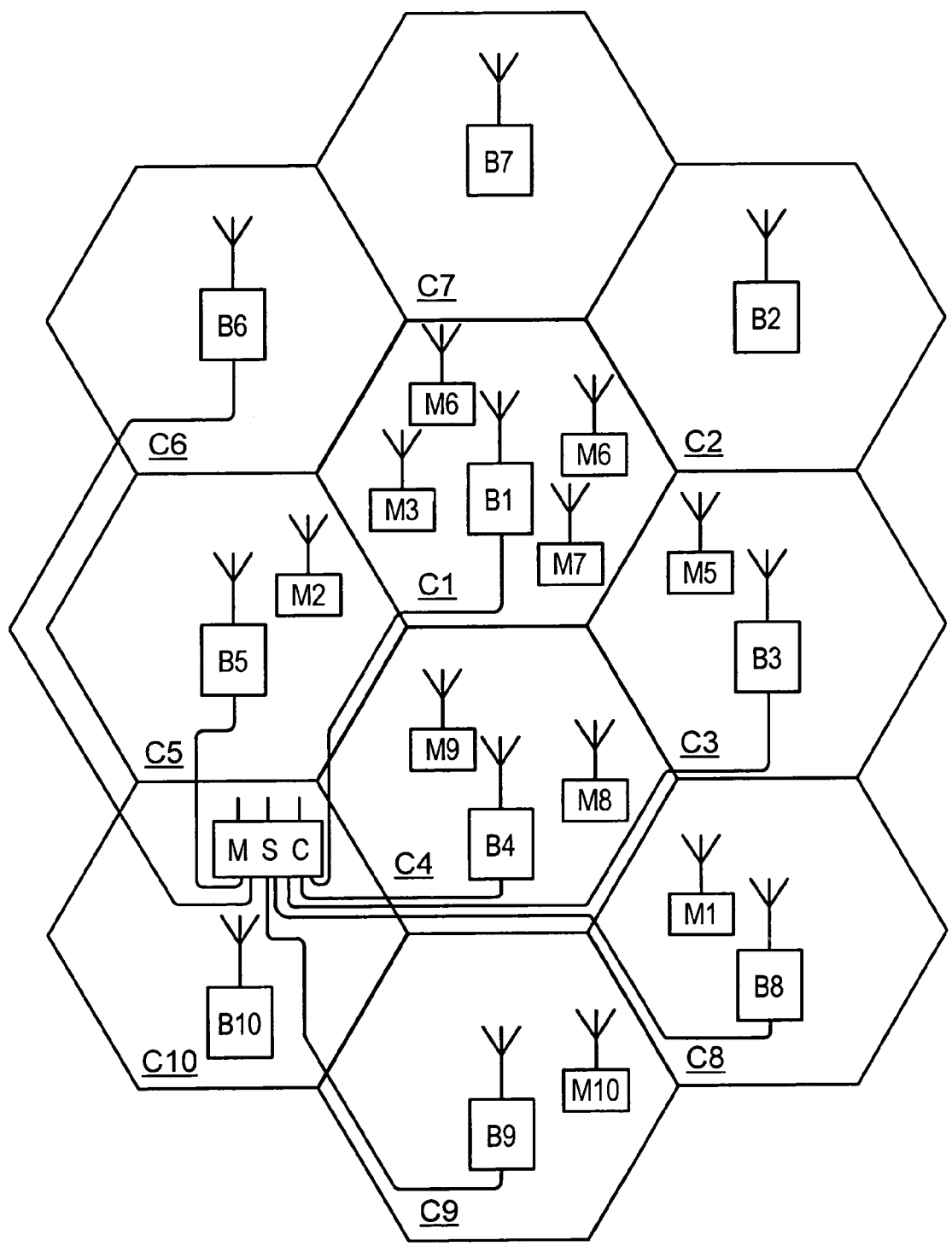
FIG. 1 depicts a conventional cellular communication system in which the present invention present invention can be utilized.
Figure 2:
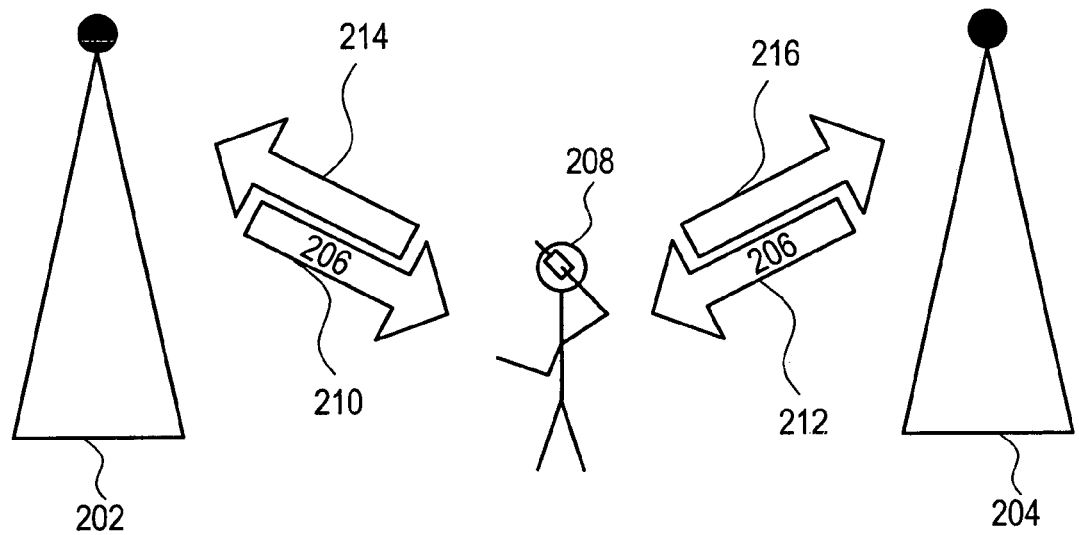
FIG. 2 depicts a soft handoff scenario wherein two individual base stations communicate with a mobile station.
Figure 3:
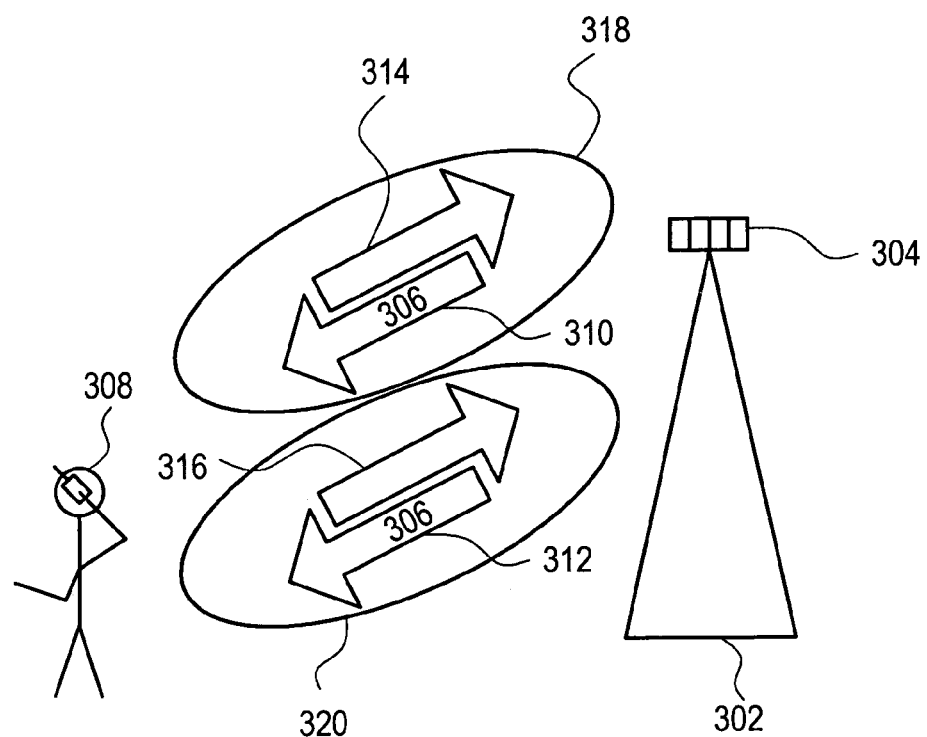
FIG. 3 depicts a macro diversity scenario wherein an individual base station communicates with a mobile station using an array antenna or plural sector antennas which propagate separate lobes each of which handles a different coverage area.
Figure 4:
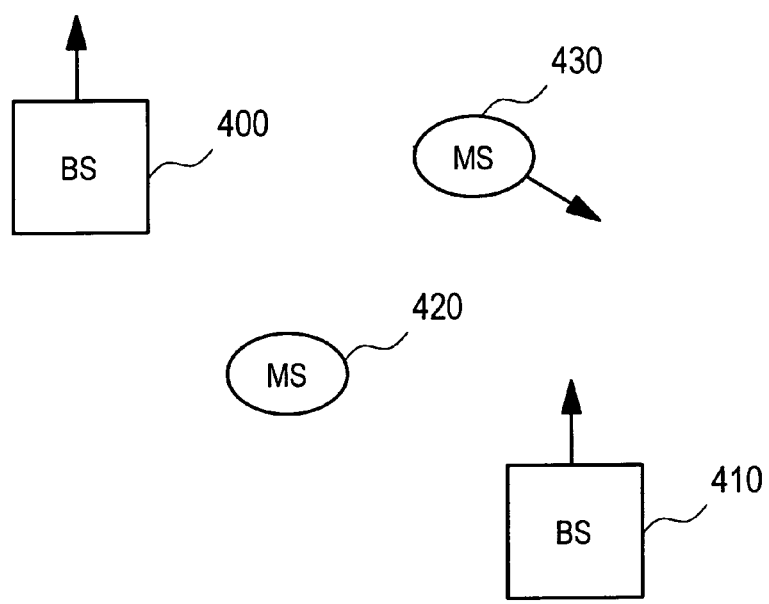
FIG. 4 illustrates an exemplary scenario according to the present invention wherein a stationary mobile station and a moving mobile station are receiving signals from two transmission sources.

Consider the exemplary situation depicted in FIG. 4. Therein, a base station 400 supports radiocommunication services in a first cell and base station 410 supports radiocommunication services in a second cell. Although not shown, the base stations 400 and 410 are in communication with a radio network controller (RNC) via a mobile switching center (MSC), which in turn is connected to a public switched telephone network (PSTN). For the purposes of this exemplary embodiment, consider that the system depicted in FIG. 4 operates using a CDMA technology with duplexed downlink (i.e. base-to-mobile direction) and uplink (i.e. mobile-to-base direction) channels. In the context of this exemplary CDMA system, a physical channel is identified by its code (i.e., short, long or combination thereof), frequency and bandwidth.

This example also depicts two mobile stations 420 and 430 disposed near the cell boundary between base stations 400 and 410. Of course, those skilled in the art will appreciate that base stations 400 and 410 would typically support connections with many mobile stations concurrently, however interaction between these two exemplary mobile stations and the network is sufficient to illustrate soft handoff/macrodiversity techniques according to the present invention. In this example, mobile station 420 is stationary or substantially stationary relative to the two base stations, while mobile station 430 is moving in the direction of the illustrated arrow away from base station 400 generally toward base station 410. However, both mobile stations are currently receiving transmissions from both base stations, i.e., they are in soft handoff mode.

As is well known in the art, the mobile station will monitor the transmissions of neighboring sources, e.g., base stations or antenna elements, while it is connected to the system. Information regarding the received signal quality and/or strength is returned to the system and used to place these neighboring sources in that mobile station's candidate set. At certain times, one or more of the sources in the candidate set may be added to the active set. For example, in many systems and particularly CDMA systems, when a mobile station approaches a cell boundary, the mobile station may enter a region wherein another transmission source (e.g., another base station and/or another antenna element from the same base station) begins to transmit substantially the same information to that mobile station. The mobile station can then combine the plural received signals to create a composite that has better quality than that which would have resulted from only receiving the information from one source.

The network recognizes that a mobile station should be added or dropped from the active set by monitoring the signal strength at which the mobile station receives transmissions from its neighboring sources and comparing the monitored values with predetermined thresholds. For example, as described in the article entitled "A Channel Assignment Scheme for Reducing Call Blocking rate in a DS-CDMA Cellular System" by Hyoung-Goo Jeon et al., the system can have a predefined parameter T_DROP such that if the measured signal strength is less than T_DROP, a transmission source is removed from the active set and a predefined parameter T_ADD such that if the measured signal strength exceeds T_ADD, the corresponding transmission source is added to the active set.

The Jeon article suggests that when system loading is high, the value of T_DROP can be increased to release traffic channels being used in soft handoff so that these traffic channels can be reused to establish new calls and prevent call blocking. However, Applicants have found that instead of waiting until system capacity is reached to address these problems, the active set associated with specific calls can be reduced by increasing T_DROP when those calls are directed to stationary mobile stations. In this way, system capacity is optimized, without adversely impacting the quality associated with ongoing connections.

Returning to the example of FIG. 4, the present invention therefore handles the active set associated with mobiles stations 420 and 430 in different ways. More specifically, as depicted in the flow chart of FIG. 5, the system first determines whether the mobile station is stationary or substantially stationary at step 500. This determination can be made in a number of different ways. For example, some radiocommunication systems provide mechanisms for determining a mobile station's position in order to, for example, rapidly respond to emergency calls placed by a user of the mobile station. Thus, a first technique for implementing the test described by step 500 is to use consecutive position values to determine whether the mobile station is moving. A second technique for identifying stationary mobiles is by determining a velocity of the mobile station. This can be accomplished by, for example, measuring the Doppler effects on the signal received at the mobile station to determine a radial velocity of the mobile station relative to the base station. A third technique for performing this check is to periodically order measurement reports relating to quality parameters associated with the signal received by the mobile station. For example, checking to see if the received signal strength, bit error rate and/or frame error rate from one of the connections are steady could provide an indication as to whether the mobile station is stationary.

If the first technique described above is used, position information can be determined in many ways. The mobile station could estimate its own position and send a message with its coordinates to the system. This could be accomplished by, for example, providing the mobile unit with a Global Positioning System (GPS) receiver that receives location information from the GPS satellite network.

Alternatively, the base stations which transmit signals to, and receive signals from, the mobile station could be used to determine the mobile station's location. Various techniques, including attenuation of a mobile station's signal, angle-of-arrival, and difference between the time-of-arrival (TDOA) of a mobile station's signal at different base stations, have been suggested for usage in providing mobile unit location information. See, for example, the article entitled "Time Difference of Arrival Technology for Locating Narrowband Cellular Signals" by Louis A. Stilp, SPIE Vol. 2602, pp. 134–144.

A third category of strategies for locating mobile stations in radiocommunication systems involves the provision of an adjunct system, i.e., a system which may be completely independent of the radiocommunication system or which may share various components (e.g., an antenna) with the radiocommunication system but which processes signals separately therefrom. This may be advantageous, for example, as an expedient solution to providing mobile unit location without modifying the large number of existing base stations in a system. More details regarding exemplary usages of adjunct systems can be found in U.S. Pat. No. 5,327,144 to Stilp et al., entitled "Cellular Telephone Location System", the disclosure of which is incorporated here by reference.

Figure 5:
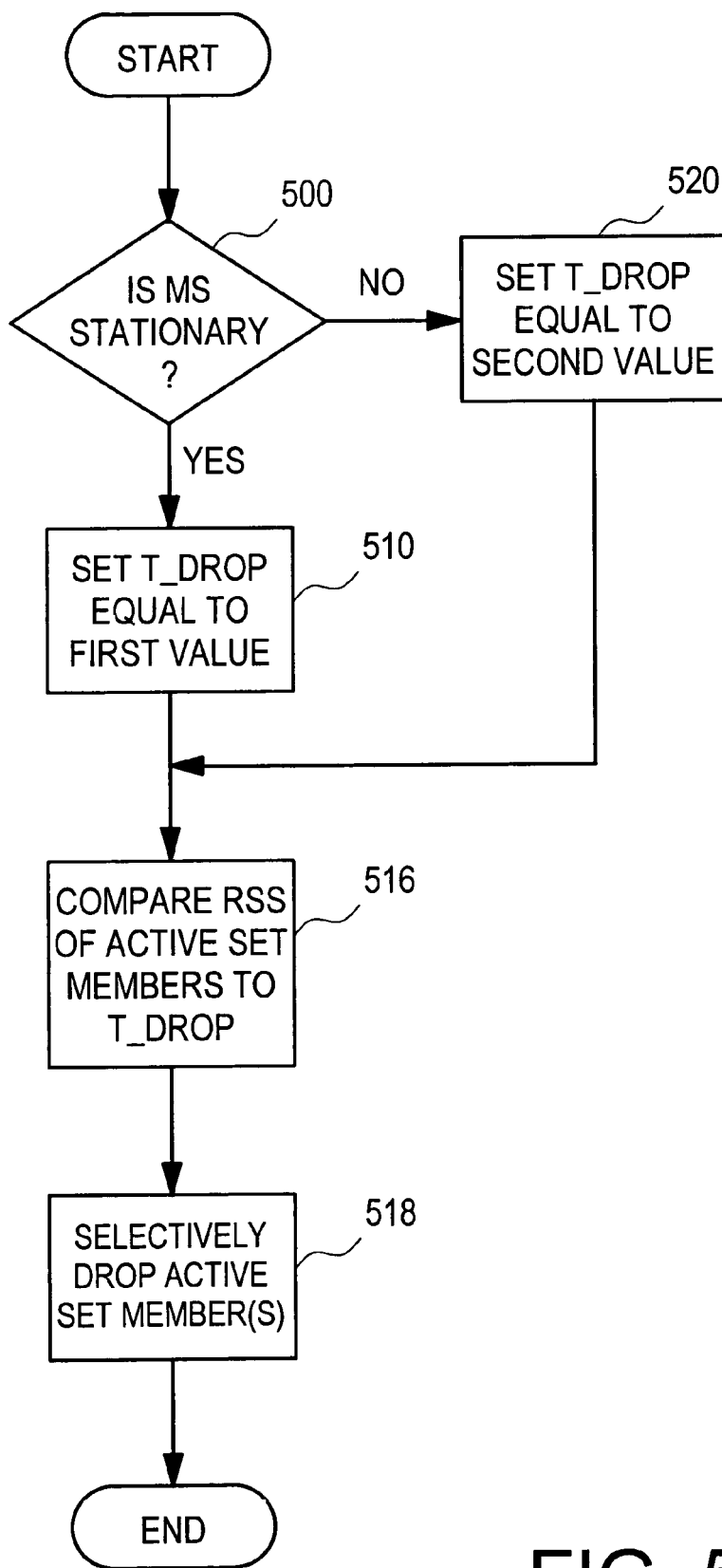
FIG. 5 is a flow chart depicting a method for handling soft handoff/macrodiversity according to an exemplary embodiment of the present invention.

Returning now to the flow chart of FIG. 5, the system can use any of the above-identified methods, or some other technique, to determine whether the mobile station is stationary or substantially stationary at step 500. Having made this determination, the system selects an appropriate threshold for dropping (and/or adding) a transmission source from (or to) the active set. For example, having determined that mobile station 420 is relatively stationary at step 500, the system can use a first T_DROP value (step 510) to determine whether to remove transmission sources from the active set. This may involve comparing the received signal strength (RSS) associated with each transmission source to the selected T_DROP value at step 516 and selectively removing those which fall below that value at step 518. Otherwise, if the system determines that the mobile station is moving, e.g., as in the case of mobile station 430, then the system can use a second value for the T_DROP parameter as shown in step 520.

Typically, the second value of T_DROP will be lower than the first value for T_DROP so that soft handoff will be continued longer and more frequently for the moving terminals which require the additional received signal(s) to maintain acceptable quality. Those skilled in the art will appreciate that the first and second values of T_DROP will likely vary from implementation to implementation based upon the network preferences of the operators. Moreover, as an alternative to providing a first higher threshold, once a mobile station is identified as stationary, the system can evaluate all of the members of the active set and drop the weakest transmission source therefrom.

After a call is taken out of soft handoff mode, T_DROP is increased and the signal quality (or the stationary quality of the mobile station) can be continuously or periodically monitored. If the quality starts deteriorating and/or the mobile station starts moving, the call will be put back into soft handoff mode again and T_DROP will be lowered.

In some cases it may be desirable that the mobile station is informed of the applicable threshold for determining whether it is eligible for soft handoff mode. For example, in some cases, T_ADD and T_DROP are cell level parameters which are provided on the broadcast control channel to all mobile stations in the cell. When one mobile unit is identified as stationary, a message can be transmitted on the traffic channel to that mobile station informing it of the new T_DROP and/or T_ADD values, without changing T_ADD and T_DROP for all mobile stations in the cell.

Although the invention has been described in detail with reference only to preferred embodiments, those skilled in the art will appreciate that various modifications can be made without departing from the invention. For example, although only two thresholds were described above, those skilled in the art will appreciate that more than two thresholds may exist and can be modified in view of whether a mobile station is stationary. Moreover, changing a threshold is not necessary to implement the concept of adjusting the active set for substantially stationary mobiles. For example, when a stationary mobile station is identified, the base station with the lowest received signal strength could reduce its transmission power until it eventually falls below an unmodified T_DROP threshold. Accordingly, the invention is defined only by the following claims which are intended to embrace all equivalents thereof.

What is claimed is:

1. A method for performing handoff in a radiocommunication system comprising the steps of:
    transmitting substantially the same information from a plurality of sources to a remote station;
    determining if said remote station is substantially stationary;
    evaluating transmissions from each of said plurality of sources using a result of said determining step; and
    selectively terminating transmissions from at least one of said plurality of sources based upon a result of said evaluating step.

2. The method of claim 1, wherein said step of evaluating further comprise the step of evaluating said transmissions against a first threshold if said remote station is substantially stationary and otherwise against a second threshold.

3. The method of claim 1, wherein said plurality of sources comprise a plurality of base stations.

4. The method of claim 1, wherein said plurality of sources comprise a plurality of antenna elements associated with a base station.

5. The method of claim 2, wherein said first threshold is higher than said second threshold wherein said step of selectively terminating is more likely to terminate a transmission source associated with a connection to a substantially stationary remote station.

6. The method of claim 1, wherein said step of determining further comprises the step of:
    performing, within said radiocommunication system, a locating function to obtain a position of said remote station and evaluating consecutive positions to determine if said remote station is substantially stationary.

7. The method of claim 1, wherein said step of determining further comprises the step of:
    detecting a velocity of said remote station.

8. The method of claim 1, wherein said step of determining further comprises the step of:
    evaluating at least one received signal quality parameter associated with said remote station.

9. A radiocommunication system comprising:
    means for transmitting substantially the same information from a plurality of sources to a remote station;
    means for determining if said remote station is substantially stationary;
    means for evaluating transmissions from each of said plurality of sources using an output of said determining mean; and
    means for selectively terminating transmissions from at least one of said plurality of sources based upon an output of said evaluating means.

10. The system of claim 9, wherein said means for evaluating compares a parameter associated with each transmission to a first threshold if said remote station is substantially stationary and otherwise against a second threshold.

11. The system of claim 9, wherein said plurality of sources comprise a plurality of base stations.

12. The system of claim 9, wherein said plurality of sources comprise a plurality of antenna elements associated with a base station.

13. The system of claim 10, wherein said first threshold is higher than said second threshold wherein said means for selectively terminating is more likely to terminate a transmission source associated with a connection to a substantially stationary remote station.

14. The system of claim 9, wherein said means for determining further comprises:
    means for performing, within said radiocommunication system, a locating function to obtain a position of said remote station and evaluating consecutive positions to determine if said remote station is substantially stationary.

15. The method of claim 1 wherein said step of evaluating further comprises evaluating transmissions from each of said plurality of sources against a threshold if said remote station is moving and otherwise identifying a weakest one of said plurality of sources.

16. The radiocommunication system of claim 9 wherein said means for evaluating transmissions from each of said plurality of sources compares said transmissions against a first threshold if said remote station is moving and otherwise identifies a weakest one of said plurality of sources.

* * * * *

UNITED STATES PATENT AND TRADEMARK OFFICE
CERTIFICATE OF CORRECTION

PATENT NO.       : 6,934,546 B1
APPLICATION NO.  : 09/069765
DATED            : August 23, 2005
INVENTOR(S)      : Eddie Corbett et al.

It is certified that error appears in the above-identified patent and that said Letters Patent is hereby corrected as shown below:

In Column 2, Line 60, delete "P/1" and insert -- P/3 --, therefor.

Signed and Sealed this

Twentieth Day of November, 2007

JON W. DUDAS
*Director of the United States Patent and Trademark Office*